United States Patent [19]
Schwarzenthal

[11] Patent Number: 6,006,152
[45] Date of Patent: Dec. 21, 1999

[54] METHOD AND DEVICE FOR MONITORING THE POSITION OF A VARIABLE VALVE CONTROL

[75] Inventor: Dietmar Schwarzenthal, Ditzingen, Germany

[73] Assignee: Dr. Ing h.c.F. Porsche AG, Weissach, Germany

[21] Appl. No.: 08/872,709

[22] Filed: Jul. 10, 1997

[30] Foreign Application Priority Data

Jul. 10, 1996 [DE] Germany .............................. 196 27 796

[51] Int. Cl.$^6$ ........................................................ G06G 7/70
[52] U.S. Cl. ............................................. 701/102; 701/29
[58] Field of Search ..................................... 701/102, 103, 701/104, 110, 101, 29; 123/520, 698, 436, 478, 480; 73/117.2, 117.3, 116, 118.1

[56] References Cited

U.S. PATENT DOCUMENTS

| | | | |
|---|---|---|---|
| 3,854,283 | 12/1974 | Stirling | 60/39.17 |
| 4,964,318 | 10/1990 | Ganoug | 123/478 |
| 5,033,425 | 7/1991 | Kadomukai et al. | 123/192.1 |
| 5,111,405 | 5/1992 | Maeda et al. | 701/110 |
| 5,390,537 | 2/1995 | Kuroda et al. | 73/117.3 |
| 5,443,045 | 8/1995 | Marconi | 123/299 |
| 5,471,869 | 12/1995 | Kuroda et al. | 73/117.3 |
| 5,485,374 | 1/1996 | Takaku et al. | 701/111 |

FOREIGN PATENT DOCUMENTS

| | | |
|---|---|---|
| 4009285 | 12/1990 | Germany . |
| 55453 | 1/1993 | Japan . |
| 7247815 | 9/1995 | Japan . |
| 7293305 | 11/1995 | Japan . |

Primary Examiner—Jacques H. Louis-Jacques
Attorney, Agent, or Firm—Evenson, McKeown, Edwards & Lenahan, PLLC

[57] ABSTRACT

The invention relates to a method and a device for monitoring the position of a variable valve control. In order to monitor the position of a variable valve control in which the construction expense is reduced, it is proposed to perform a cylinder-specific analysis of the nonuniformity of the rotational speed of the crankshaft and from this to determine the operating state of the valve control, possibly for each cylinder individually.

19 Claims, 4 Drawing Sheets

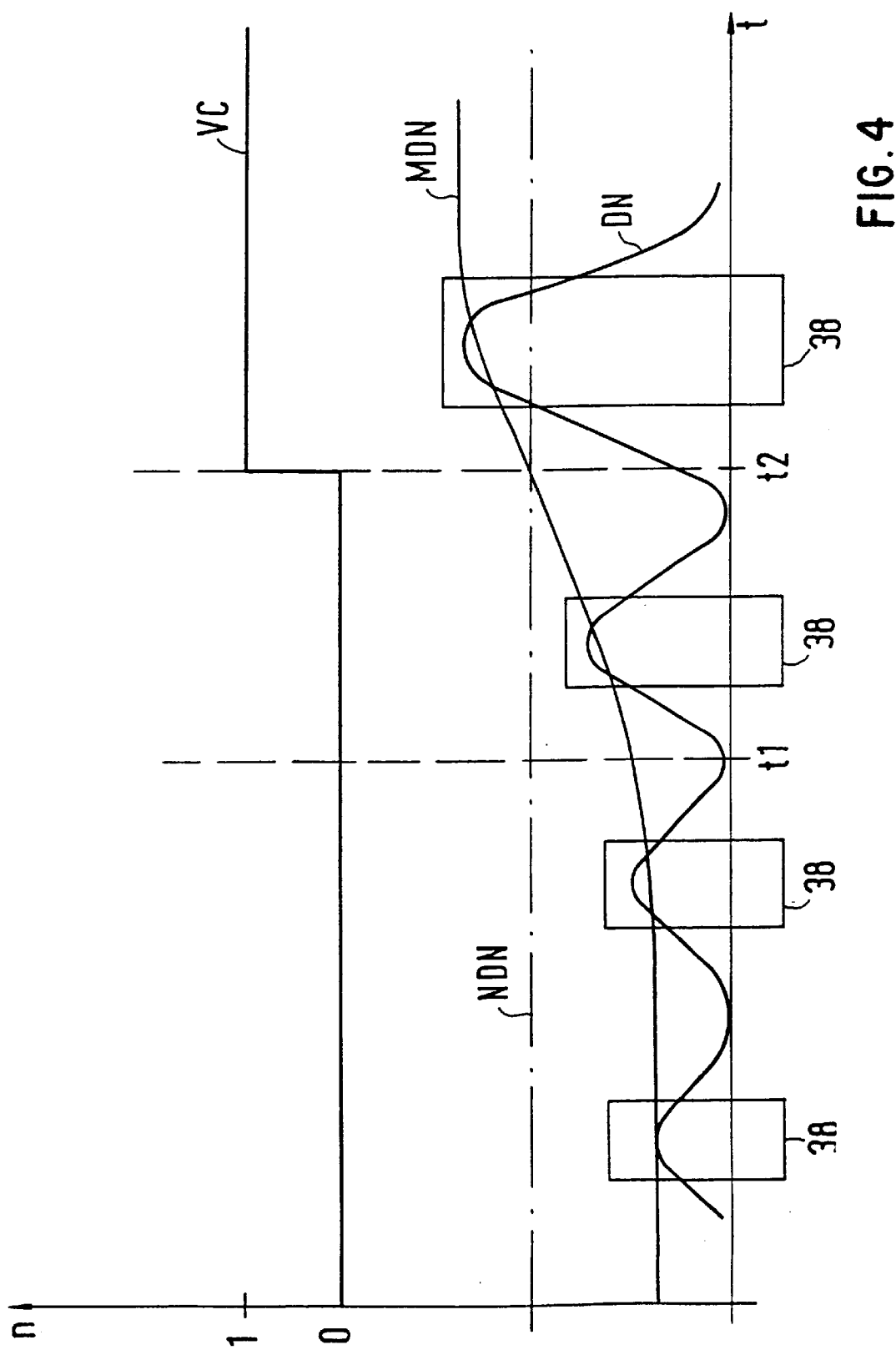

METHOD AND DEVICE FOR MONITORING THE POSITION OF A VARIABLE VALVE CONTROL

BACKGROUND AND SUMMARY OF THE INVENTION

This application claims the priority of German application 196 27 796.5 filed in Germany on Jul. 10, 1996, the disclosure of which is expressly incorporated by reference herein.

The invention relates to a method and a device for monitoring the position of a variable valve control.

In internal combustion engines equipped with a variable valve control, it is necessary to monitor the function of this variable valve control at regular intervals. Known monitoring methods determine the position of a component used to adjust the valve control in order thus to determine the current position of the valve control. However, a monitoring method of this kind provides only a general idea of how the valve control is being controlled at a given moment.

Methods are also known for detecting when combustion does not occur in internal combustion engines, said methods being based on an analysis of the curve of the angular velocity of the crankshaft during one working cycle of a cylinder of the internal combustion engine. Failure of combustion to occur results in particular changes in the speed curve by comparison to the normal state. A method of this kind is described for example in German Patent Document DE 40 09 285 A1.

On the other hand, an object of the invention is to provide a method and a device for monitoring the position of a variable valve control in which the construction cost is reduced.

This object is achieved by providing a system and a method for carrying out the following steps:
  detecting a nonuniformity in the rotational speed of a crankshaft in an internal combustion engine;
  evaluating the nonuniformity of the rotational speed of the crankshaft in terms of the combustion state of the engine; and
  associating the combustion state with a position of the variable valve control.

The invention is based on the fact that the combustion process in the individual cylinders is also dependent on the operating behavior and/or operating state of a variable valve control. In particular, during shifting of a variable valve control, the combustion state of the individual cylinders changes considerably. This combustion process and/or its change can be detected using the analysis, known of itself, of the angular velocity of the crankshaft, more specifically the uniformity of the rotary movement of the crankshaft. Information about the operating state of the variable valve control is then obtained from the combustion process and/or the uniformity of rotation of the crankshaft as detected.

The invention is associated with the particular advantage that in addition to reducing the cost of measurement technology, since a sensor for the angular position of the crankshaft is provided in any case in modern internal combustion engines, only the operating state of a variable valve control is determined on the basis of the combustion state of the engine as influenced by the variable valve control. This is especially important if monitoring of the variable valve control is required for monitoring and detecting the maintenance of legally prescribed exhaust values (OBD II). In addition to reducing the cost of measurement technology, the invention offers the additional advantage that both control and monitoring of the variable valve control take place in the engine control device. Since this engine control device receives the signal from the crankshaft angle sensor in any event, the invention can be implemented within an engine control device without additional leads or pins being required on the control device.

Thus it is proposed according to certain preferred embodiments of the invention to conduct and evaluate the analysis of the uniformity of the rotational speed of the crankshaft in a cylinder-specific manner, and from this to determine the combustion state, once again in a cylinder-specific manner, and to compare it with the combustion state of the other cylinders. The deviation of the combustion state of an individual cylinder from the average value of the combustion states in all the cylinders then provides information about any improper behavior of the variable valve control with respect to individual cylinders.

The design of the invention is facilitated if, as is also proposed according to certain preferred embodiments of the invention, the crankshaft angle sensor signal is evaluated by the irregularity of the rotational speed of the crankshaft that is determined being compared with boundary values that are stored as normal or reference values in a memory and depend on the load and rotational speed of the internal combustion engine.

Finally, it is proposed according to certain preferred embodiments of the invention, to plot the curve of the irregularities in the rotational speed of the crankshaft to evaluate the crankshaft angle sensor signal and then to compare them with a given curve. Since the curve of the nonuniformity of the rotational speed of the crankshaft is critical in this respect, this evaluation is largely inconspicuous by comparison with external disturbances. For further simplification, it can be provided that this evaluation be performed only when the position of the variable valve control is changed. In this way, the control device is relieved of this monitoring task for the rest of the time.

Monitoring the variable valve control according to the invention can be presented as part of a program-controlled control device for the vehicle (method), and with the same advantages, and as a discrete circuit (device).

Other objects, advantages and novel features of the present invention will become apparent from the following detailed description of the invention when considered in conjunction with the accompanying drawings.

BRIEF DESCRIPTION OF THE DRAWINGS

FIG. 4 is a graph showing nonuniformity of the rotational speed of a crankshaft, an average of this nonuniformity of the rotational speed of the crankshaft, a normal value for the nonuniformity of the rotational speed of the crankshaft, as well as an output signal VC from the control device as a function of time t to illustrate the operation.

DETAILED DESCRIPTION OF THE DRAWINGS

Figure 1:
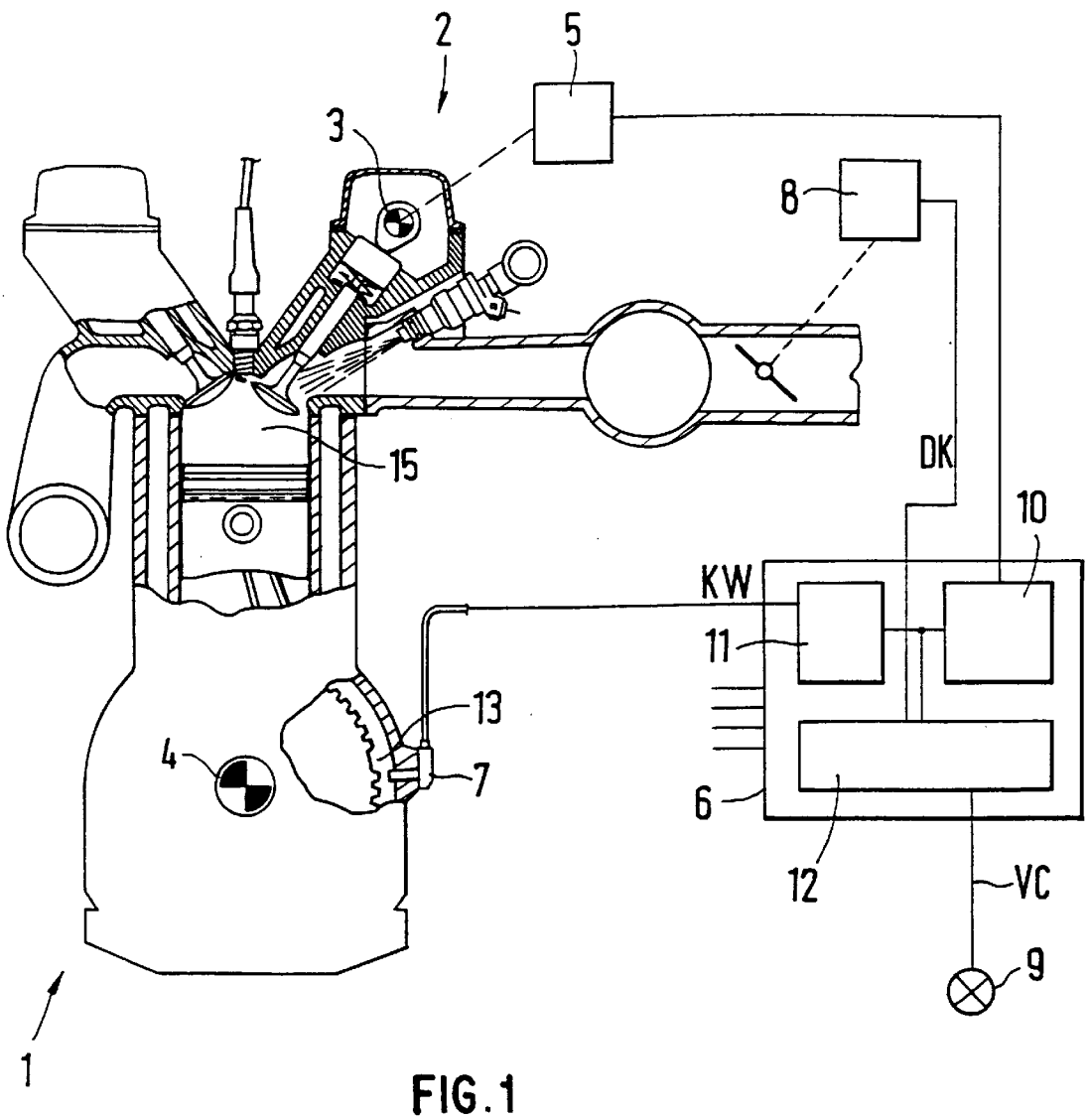
FIG. 1 is a schematic diagram of an internal combustion engine with a variable valve control and a control device therefor constructed in accordance with preferred embodiments of the present invention.

FIG. 1 shows in schematic form an internal combustion engine 1 equipped with a variable valve control 2, in other words, a control in which the ratio of the angular position of a camshaft 3, in this case the intake camshaft, is variable with respect to the angular position of a crankshaft 4 by means of an adjusting device 5. Adjusting device 5 is controlled by a control device 6 which, in addition to additional signals from a crankshaft sensor 7 not shown, receives a signal KW for the angular position of crankshaft 4 and a signal DK from a throttle sensor 8, said signal DK corresponding to the load on internal combustion engine 1. A display 9 is also controlled by control device 6.

In a first embodiment, a control device 6 has, among other things, a valve control device 10, an evaluation device 11, and a monitoring device 12. Evaluation device 11 and monitoring device 12 together with crankshaft sensor 7, which in this case acts as a sensing device to detect nonuniformity of the rotational speed of crankshaft 4, together constitute a device for monitoring the position of variable valve control 2.

Figure 2:
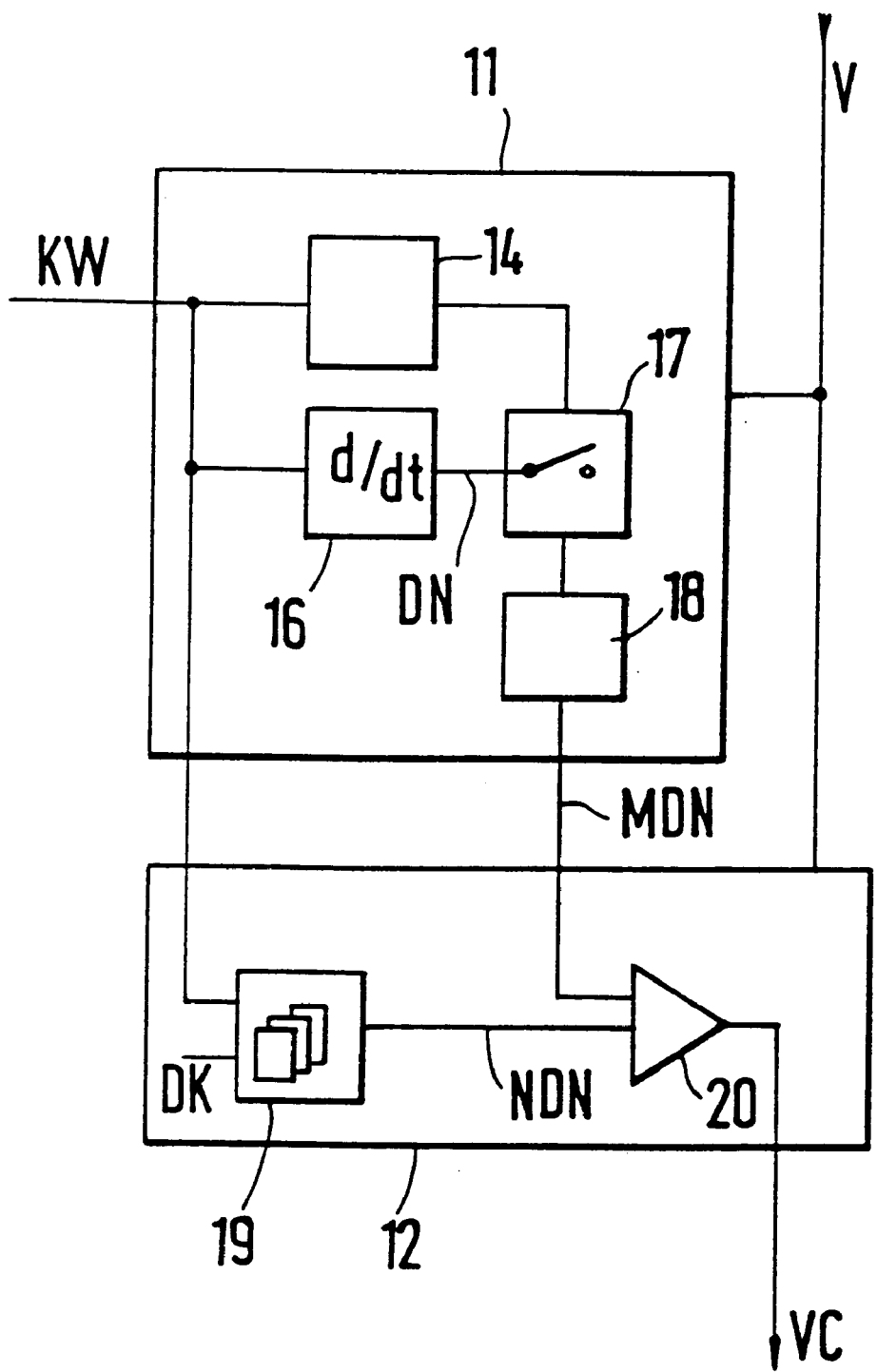
FIG. 2 is a block diagram depicting a first embodiment for an evaluation device located in the control device and for a monitoring device.

In the block diagram in FIG. 2, evaluation unit 11 as well as monitoring device 12 are shown in greater detail. Evaluating device 11 receives from crankshaft sensor 7 a signal KW corresponding to the angular position of crankshaft 4. In the present embodiment, this signal consists of a pulse train, with each pulse corresponding to a specific section of an angle swept by crankshaft 4. At a designated position of the crankshaft, a mark 13 is made that generates a special pulse and therefore makes it possible to determine the absolute position of the crankshaft.

A discriminator unit 14 evaluates the position of crankshaft 4 with the aid of crankshaft signal KW and generates a signal each time a combustion process takes place in a cylinder 15 of engine 1. In parallel with discriminator 14, the crankshaft signal KW is differentiated by a differentiator 16 to obtain a signal DN that describes a lack of uniformity of the angular motion of crankshaft 4. The nonuniformity signal DN is fed by a switch 17 to an average former 18, with switch 17 being controlled by the output signal from discriminator 14 and closing only when discriminator 14 detects a combustion process. Thus a signal MDN is applied to the output side of average former 18, said signal describing the average of the nonuniformity of the angular motion of crankshaft 4 at those points in time at which a combustion process takes place in cylinder 15. In addition to the average value signal MDN and the crankshaft signal KW, monitoring device 12 also receives signal DK from throttle sensor 8. Depending on signal DK of throttle sensor 8 and depending on signal KW from crankshaft sensor 7, normal values for the average of the nonuniformity of the rotational speed of the crankshaft MDN are stored in a memory 19. A comparator 20 compares the current average of the nonuniformity of the rotational speed of the crankshaft MDN with the normal value of the nonuniformity of the rotational speed of the crankshaft NDN determined previously, and transmits a signal VC to control display 9 when the difference between the two values exceeds a predetermined value. In the present embodiment, in which variable valve control 2 can be set to only two positions, output signal VC indicates that variable valve control 2 is in its operating position, in which the internal combustion engine is delivering higher power, while when output signal VC is absent the variable valve control is in its resting position and internal combustion engine 1 is delivering less power.

A signal V supplied to both evaluation device 11 and monitoring device 12 is generated by valve control 10 and indicates that valve control 10 is engaged, controlling adjusting device 5 and thus moving variable valve control 2 into its activated state. Signal V is used for both evaluation device 11 and monitoring device 12, in other words, both devices are active only when valve control 10 is performing an adjustment of variable valve control 2.

Figure 3:
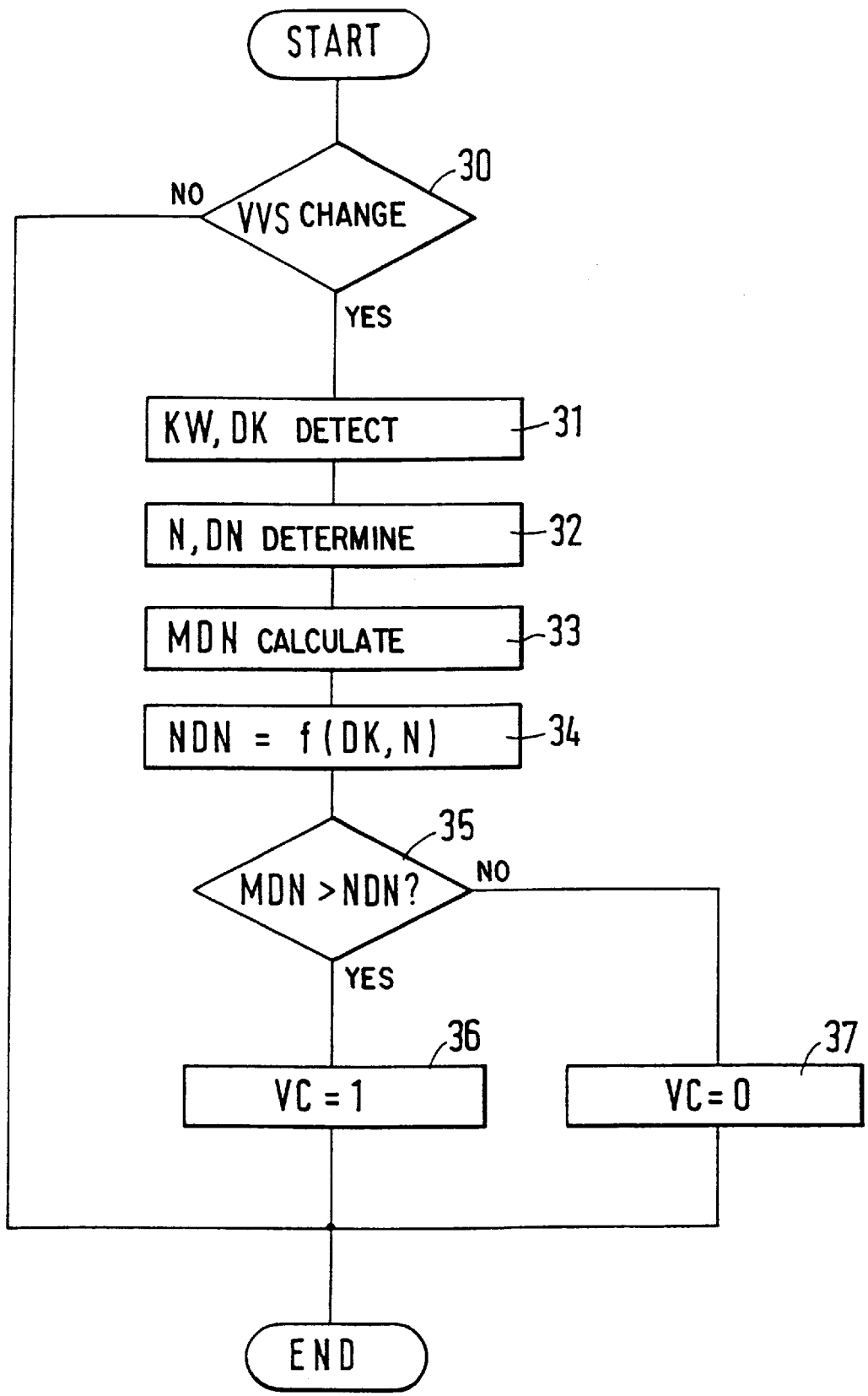
FIG. 3 is a flowchart depicting a second embodiment of a program process that takes place in the control device.

Rather than consisting of discrete structural units as described above, the invention can also be a part of a programmed process when control device 6 is a control device with a program memory. Such a program process is shown in FIG. 3 as the second embodiment, in the form of a flowchart. The process begins with a step 30 in which a check is made to determine whether the position of variable valve control 2 is to be changed. If this is not the case, the program process ends immediately and step 31 follows instead. In step 31, signal KW from crankshaft sensor 7 and signal DK from throttle sensor 8 are detected as input values. In the next step 32, this information is used in the same way as in the first embodiment to determine the crankshaft rotational speed N and the nonuniformity of the rotational speed of the crankshaft DN. From the nonuniformity of the rotational speed of the crankshaft DN, the average MDN is then calculated in step 33, with this calculation taking into account only those values of the nonuniformity of the rotational speed of the crankshaft DN that are detected during a combustion process. In this connection, the crankshaft angle KW helps to determine whether a combustion process is taking place or not. Finally, in step 34 the normal value for the nonuniformity of the rotational speed of the crankshaft NDN is read from a characteristic map that depends on the throttle position DK and the crankshaft rpm N. In step 35, the calculated average of the nonuniformity of the rotational speed of the crankshaft MDN is compared with the normal value of the nonuniformity of the rotational speed of the crankshaft NDN in such fashion that a check is made to determine whether the average value MDN is greater than the normal value NDN. If this is the case, an output signal VC=1 is output in step 36. On the other hand, if the comparison leads to a negative result, an output signal VC=0 is output as an alternative in step 37. The program ends with step 36 or step 37.

The operation of the device described in the first embodiment and/or the method described in the second embodiment will now be explained with reference to the graph shown in FIG. 4. In the graph according to FIG. 4, for example, the nonuniformity of the rotational speed of the crankshaft DN, the average value of the nonuniformity of the rotational speed of the crankshaft MDN, the normal value of the nonuniformity of the rotational speed of the crankshaft NDN, and the output signal VC are plotted as a function of time t. For the sake of simplicity, it will be assumed that the internal combustion engine is in steady state operation and so the throttle position signal DK and the crankshaft rpm N have constant values. Under this assumption, a pulsating curve is obtained for the nonuniformity of the rotational speed of the crankshaft DN, with an increased value of the nonuniformity of the rotational speed of the crankshaft DN appearing during a combustion process, indicated by a window 38, because of the torque applied during the combustion process to crankshaft 4. Since the nonuniformity of the rotational speed of the crankshaft DN is detected and evaluated only in windows 38, a curve that approximately corresponds to the peaks of the nonuniformity of the rotational speed of the crankshaft DN is obtained as the average for the nonuniformity of the rotational speed of the crankshaft MDN.

At point in time t1, valve control 2 is adjusted so that engine 1 delivers a higher torque. As soon as camshaft 3 has actually been adjusted and the combustion process in cylinder 15 has changed as a result, to the point where a higher torque is actually being applied to crankshaft 4, this becomes visible as an increase in both the nonuniformity of the rotational speed of the crankshaft DN and the average value of the nonuniformity of the rotational speed of the crankshaft MDN.

At point in time t2, the average value of the nonuniformity of the rotational speed of the crankshaft MDN exceeds the normal value of the nonuniformity of the rotational speed of the crankshaft NDN, whereupon output signal VC changes from the 0 state to the 1 state.

This signal VC can then be used in many different ways in the two embodiments. In the simplest form, display 9 is controlled with the aid of signal VC, said display indicating to the driver that valve control 2 is in its activated state. Similarly, signal VC from other control devices can be evaluated; in particular, it is logical to have valve control 10 evaluate signal VC as a check on the performance of the adjustment of valve control 2 and thus of the safety function of adjusting device 5.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for monitoring the position of a variable valve control of an internal combustion engine, comprising the following steps:
   detecting a nonuniformity in the rotational speed of a crankshaft in an internal combustion engine;
   evaluating the nonuniformity of the rotational speed of the crankshaft during the combustion state of the engine to determine an average value of said nonuniformity; and
   comparing the average value of said nonuniformity with a reference value to determine the position of the variable valve control,
   wherein said evaluating comprises taking said average value of the nonuniformity of the rotational speed of the crankshaft in all cylinders to evaluate the nonuniformity of the rotational speed of the crankshaft with respect to the combustion state;
   wherein a deviation of the average value from a normal value that depends at least on the rotational speed and load state of the internal combustion engine is formed, and
   wherein the current position of the variable valve control is determined from said deviation.

2. Method according to claim 1, wherein the method is implemented only when the position of the variable valve control is changed.

3. Method for monitoring the position of a variable valve control of an internal combustion engine, comprising the following steps:
   detecting a nonuniformity in the rotational speed of a crankshaft in an internal combustion engine;
   evaluating the nonuniformity of the rotational speed of the crankshaft during the combustion state of the engine to determine an average value of said nonuniformity; and
   comparing the average value of said nonuniformity with a reference value to determine the position of the variable valve control,
   wherein said evaluating comprises taking said average value of the nonuniformity of the rotational speed of the crankshaft in all cylinders to evaluate the nonuniformity of the rotational speed with respect to the combustion state; and
   wherein the average value is compared with a boundary value that is at least dependent on the rotational speed and load state of the engine to determine the position of the variable valve control, with exceeding the boundary value being associated with the controlled position of the variable valve control.

4. Method for monitoring the position of a variable valve control of an internal combustion engine, comprising the following steps:
   detecting a nonuniformity in the rotational speed of a crankshaft in an internal combustion engine;
   evaluating the nonuniformity of the rotational speed of the crankshaft during the combustion state of the engine to determine an average value of said nonuniformity; and
   comparing the average value of said nonuniformity with a reference value to determine the position of the variable valve control,
   wherein said evaluating comprises initially taking said average value of the nonuniformity of the rotational speed of the crankshaft in all cylinders, and then calculating a curve of the average value of the nonuniformity of the rotational speed of the crankshaft in all cylinders to evaluate the nonuniformity of the rotational speed of the crankshaft with regard to the combustion state,
   wherein a deviation of the curve with a normal curve that is at least dependent on the rotational speed and the load state of the engine, is formed to determine the position of the variable valve control, and
   wherein the current position of the variable valve control is determined from said deviation.

5. Method for monitoring the position of a variable valve control of an internal combustion engine, comprising the following steps:
   detecting a nonuniformity in the rotational speed of a crankshaft in an internal combustion engine;
   evaluating the nonuniformity of the rotational speed of the crankshaft during the combustion state of the engine to determine an average value of said nonuniformity; and
   comparing the average value of said nonuniformity with a reference value to determine the position of the variable valve control,
   wherein said evaluating comprises initially taking said average value of the nonuniformity of the rotational speed of the crankshaft in all the cylinders to evaluate the nonuniformity of the rotational speed of the crankshaft with regard to the combustion state, and then plotting a curve of the average value of the nonuniformity of the rotational speed of the crankshaft for all the cylinders;
   wherein the curve is compared with a boundary curve that is at least dependent on the rotational speed and the load state of the internal combustion engine, to determine the position of the variable valve control, and exceeding of the boundary curve is associated with the controlled position of the variable valve control.

6. Method for monitoring the position of a variable valve control of an internal combustion engine, comprising the following steps:
   detecting a nonuniformity in the rotational speed of a crankshaft in an internal combustion engine;
   evaluating the nonuniformity of the rotational speed of the crankshaft during the combustion state of the engine to determine an average value of said nonuniformity; and comparing the average value of said nonuniformity with a reference value to determine the position of the variable valve control, wherein said evaluating comprises determining the nonuniformity of the rotational speed of the crankshaft in a cylinder-specific manner for each cylinder to evaluate the nonuniformity of the rotational speed of the crankshaft with respect to the combustion state, and said average value of the nonuniformity of the rotational speed of the crankshaft is taken in all cylinders; and wherein the nonuniformity of the rotational speed of the crankshaft of each individual cylinder is compared with the average value of the nonuniformity of the rotational speed of the crankshaft to determine the position of the variable valve control, a deviation of the nonuniformity of the rotational speed of the crankshaft from the average valve of the nonuniformity of the rotational speed of the crankshaft is determined in a cylinder-specific manner, and an error message is output in the event of a boundary value for the deviation being exceeded that depends at least on the rotational speed and the load state of the engine.

7. Method for monitoring the position of a variable valve control of an internal combustion engine, comprising the following steps:

detecting a nonuniformity in the rotational speed of a crankshaft in an internal combustion engine;

evaluating the nonuniformity of the rotational steed of the crankshaft during the combustion state of the engine to determine an average value of said nonuniformity; and comparing the average value of said nonuniformity with a reference value to determine the position of the variable valve control, wherein the method is implemented only when the position of the variable valve control is changed.

8. Device for monitoring the position of a variable valve control of an internal combustion engine, comprising:

a sensor operably detecting nonuniformity of the rotational speed of the crankshaft of the internal combustion engine;

an evaluator operably evaluating the nonuniformity of the rotational speed of the crankshaft during the combustion state of the internal combustion engine to determine an average value of said nonuniformity; and a monitor for comparing the average value of said nonuniformity with a reference value to determine the position of the variable valve control, wherein the evaluator has an average former for determining said average value of the nonuniformity of the rotational speed of the crankshaft in all the cylinders;

wherein the monitoring device has:
  a memory for a normal value of the nonuniformity of the rotational speed of the crankshaft that is dependent at least on the rotational speed and the load state of the engine, and
  a comparator, with the comparator forming the deviation of the average value from the normal value, and wherein an output unit assigns and outputs the degree of deviation of the current position of the variable valve control.

9. Device according to claim 8, comprising an activating device operable to activate the evaluating device only when the position of the variable valve control is changed.

10. Device for monitoring the position of a variable valve control of an internal combustion engine, comprising:

a sensor operably detecting nonuniformity of the rotational speed of the crankshaft of the internal combustion engine;

an evaluator operably evaluating the nonuniformity of the rotational speed of the crankshaft during the combustion state of the internal combustion engine to determine an average value of said nonuniformity; and a monitor for comparing the average value of said nonuniformity with a reference value to determine the position of the variable valve control, wherein the evaluator has an average former for determining said average value of the nonuniformity of the rotational speed of the crankshaft in all the cylinders; and wherein the monitor has:
  a memory for a boundary value of the nonuniformity of the rotational speed of the crankshaft, which is dependent on at least the rotational speed and load state of the engine, and
  a comparator, with the comparator comparing the average value with the boundary value and, when the boundary value is exceeded, outputting a signal that characterizes the controlled position of the variable valve control.

11. Device for monitoring the position of a variable valve control of an internal combustion engine, comprising:

a sensor operably detecting nonuniformity of the rotational speed of the crankshaft of the internal combustion engine;

an evaluator operably evaluating the nonuniformity of the rotational speed of the crankshaft during the combustion state of the internal combustion engine to determine an average value of said nonuniformity; and a monitor for comparing the average value of said nonuniformity with a reference value to determine the position of the variable valve control, wherein the evaluator has an average former for determining said average value of the nonuniformity of the rotational speed of the crankshaft over all the cylinders, followed by a display device for the curve of the average value of the nonuniformity of the rotational speed of the crankshaft, and wherein the monitor has:
  a memory for a normal curve of the average value of the nonuniformity of the rotational speed of the crankshaft, which is dependent at least on the rotational speed and load state of the internal combustion engine, and
  a comparator, with the comparator forming the deviation of the curve of the average from the normal curve, and wherein an output unit assigns and outputs the degree of deviation of the current position of the variable valve control.

12. Device for monitoring the position of a variable valve control of an internal combustion engine, comprising:

a sensor operably detecting nonuniformity of the rotational speed of the crankshaft of the internal combustion engine;

an evaluator operably evaluating the nonuniformity of the rotational speed of the crankshaft during the combustion state of the internal combustion engine to determine an average value of said nonuniformity; and a monitor for comparing the average value of said nonuniformity with a reference value to determine the position of the variable valve control, wherein the evaluator device has an average former for determining said average value of the nonuniformity of the rotational speed of the crankshaft in all the cylinders, followed by a display device for the curve of the average of the nonuniformity of the rotational speed of the crankshaft;

wherein the monitor has:
   a memory for a boundary curve of the average value of the nonuniformity of the rotational speed of the crankshaft, which is dependent on at least the rotational speed and load state of the internal combustion engine, and
   a comparator, with the comparator comparing the curve of the average value with the boundary curve and, if the boundary curve is exceeded, outputting a signal that characterizes the controlled position of the variable valve control.

13. Device for monitoring the position of a variable valve control of an internal combustion engine, comprising:
   a sensor operably detecting nonuniformity of the rotational speed of the crankshaft of the internal combustion engine;
   an evaluator operably evaluating the nonuniformity of the rotational speed of the crankshaft during the combustion state of the internal combustion engine to determine an average value of said nonuniformity; and
   a monitor for comparing the average value of said nonuniformity with a reference value to determine the position of the variable valve control,
   wherein the evaluator includes a discriminator for cylinder-specific detection of the nonuniformity of the rotational speed of the crankshaft and an average former for determining said average value of the nonuniformity of the rotational speed of the crankshaft in all the cylinders; and
   wherein the monitoring device has a comparator, with the comparator determining the deviation of the nonuniformity of the rotational speed of the crankshaft of each individual cylinder and outputs an error message when a stored boundary value is exceeded for the deviation that depends at least on the rotational speed and the load state of the internal combustion engine.

14. Device for monitoring the position of a variable valve control of an internal combustion engine, comprising:
   a sensor operably detecting nonuniformity of the rotational speed of the crankshaft of the internal combustion engine;
   an evaluator operably evaluating the nonuniformity of the rotational speed of the crankshaft during the combustion state of the internal combustion engine to determine an average value of said nonuniformity;
   a monitor for comparing the average value of said nonuniformity with a reference value to determine the position of the variable valve control; and
   an activating device operable to activate the evaluating device only when the position of the variable valve control is changed.

15. Method for monitoring a position of a variable valve control of an internal combustion engine having a crankshaft and a plurality of cylinders, said method comprising the steps of:
   determining a rotational speed of the crankshaft;
   determining a nonuniformity in the rotational speed of the crankshaft during a combustion cycle of each cylinder;
   calculating an average value of the nonuniformity in the rotational speed of the crankshaft for all of the cylinders;
   comparing the average value of the nonuniformity with a reference value;
   determining the position of the variable valve control based on a result of said comparing step;
   comparing the nonuniformity value determined for each cylinder with a boundary value for the deviation of the nonuniformity value; and
   outputting an error message if the nonuniformity value exceeds the boundary value.

16. Method according to claim 15, wherein the reference value is a normal value that is calculated based on at least one of the rotational speed and a load state of the internal combustion engine.

17. Method according to claim 15, wherein the reference value is a boundary value that is calculated based on at least one of the rotational speed and a load state of the internal combustion engine.

18. Method according to claim 15, wherein said calculating step comprises calculating a curve of the average value of the nonuniformity values for all of the cylinders.

19. Method according to claim 15, wherein the method is carried out following a change in the variable valve control.

* * * * *